United States Patent
Chambers

(10) Patent No.: US 6,293,477 B1
(45) Date of Patent: Sep. 25, 2001

(54) METHOD AND APPARATUS FOR DISTRIBUTION AND/OR COLLECTION OF FLUIDS

(76) Inventor: Robert J. Chambers, 4110 Rincon Ave., Montrose, CA (US) 91020

( * ) Notice: Subject to any disclaimer, the term of this patent is extended or adjusted under 35 U.S.C. 154(b) by 0 days.

(21) Appl. No.: 09/413,674

(22) Filed: Oct. 6, 1999

(51) Int. Cl.$^7$ .................................................. B05B 15/00
(52) U.S. Cl. ..................... 239/542; 239/553.3; 239/145; 47/9
(58) Field of Search ............................... 239/542, 553.3, 239/553.5, 145, 450; 47/9, 56, 101 R

(56) References Cited

U.S. PATENT DOCUMENTS

| | | | |
|---|---|---|---|
| 3,205,619 | * | 9/1965 | Henry .......................................... 47/9 |
| 3,404,845 | * | 10/1968 | Schmeling et al. ............... 239/553.5 |
| 3,939,875 | * | 2/1976 | Osborn et al. ........................ 239/145 |
| 4,047,995 | * | 9/1977 | Leal-Diaz .............................. 239/542 |
| 4,833,822 | * | 5/1989 | DiGrassi ..................................... 47/9 |
| 5,070,643 | * | 12/1991 | Hinsperger ................................. 47/9 |
| 5,301,633 | * | 4/1994 | Lloyd ..................................... 239/145 |

* cited by examiner

Primary Examiner—David A. Scherbel
Assistant Examiner—Dinh Q. Nguyen
(74) Attorney, Agent, or Firm—Dobrusin Darden Thennisch & Lorenz PC

(57) ABSTRACT

A fluid collection and distribution system (irrigator) configured from a flexible or semi-flexible material which can conform to various sizes and shapes of terrain. According to various embodiments of the irrigator, seep holes may be provided. Additionally, the irrigator may be configured from a porous material. In various embodiments, the irrigator contains through holes for various plant life to take root through and for facilitating drainage. The irrigator may have multiple, distinct passages for the collection and/or distribution of multiple fluids and or gases. In addition, a irrigator forming device is provided for forming the irrigator. Still further, an irrigator cutting device is provided for customizing and repairing the irrigator.

19 Claims, 10 Drawing Sheets

METHOD AND APPARATUS FOR DISTRIBUTION AND/OR COLLECTION OF FLUIDS

BACKGROUND OF THE INVENTION

1. Technical Field

The present invention relates to a method and apparatus for collecting and/or distributing liquids and gas.

2. Background of the Invention

Various liquid and gas collection and distribution devices such as sprinklers, seep hose systems and drip systems are well known in the landscaping industry. However, currently available systems suffer from and are subject to a variety of drawbacks resulting in high cost, maintenance, installation time, and often result in excessively wet or dry spots in the terrain intended to be irrigated.

For example, sprinklers systems arc typically comprised of a series of irrigation pipes or hoses which are connected to one or more sprinkler "heads." Irrigation substances such as water, fertilizer, insecticide, etc. are then pumped through the piping and sprinkler head for distribution over a desired area. However, though sprinklers generally provide adequate irrigation, they tend to suffer from their exposed nature, inherent inefficiencies, and high maintenance costs.

For example, because the sprinkler heads typically are exposed to the environment, they are at an increased risk to vandalism and damage from landscaping devices such as lawn mowers, tractors, plows, and the like. Additionally, because the sprinklers are so exposed, "natural" elements such as ultra violet rays from the sun, rain, snow and ice cause the sprinklers to degrade more rapidly. Finally, as the sprinklers typically consist of several mechanical components, they generally require a substantial amount of maintenance.

Seeping hose systems suffer from similar problems. The systems generally consist of permeable tubing which is connected to a water (or other fluid) source. The hose is then placed on the surface (or, alternatively, just under the surface) of the land to be irrigated. To operate the system, the tubing is unrolled, arranged along the ground and connected to the fluid source. As the fluid flows through the tubing, the permeable nature of the tubing allows the fluid to "seep" through the walls of the tubing, thus irrigating the area adjacent to the tubing.

However, like the sprinkler system, the seeping system suffers from several problems. For example, it is typically difficult to be certain the seeping system is sufficiently irrigating the desired area and, similarly, to know whether the water or other fluid is being evenly distributed, thus further creating unevenness in irrigation.

In addition, the tubing generally does not perform well on uneven areas of land. When the tubing is placed on "hilly" or rolling terrain, no means are available to provide sheer-resistance to hillsides before plant life roots take hold of the ground.

Lastly, the complexity of the seeping tube system creates inherently large installation costs and installation time.

Alternative irrigation systems have therefore developed. For example of the device disclosed in U.S. Pat. No. 4,887,386, issued to Ronald G. Minshul on Dec. 19, 1989 is one such irrigation device. The patent discloses a panel-like system for collecting and/or distributing fluids and gases. The device comprises, generally, rigid panels through which gases and fluids may flow which are connected to a framework of piping. However, the device disclosed in the patent suffers from its inherent rigidity and complicated framework. Because the panels are rigid, they fail to conform to uneven and/or sloped terrain, and the complex network of framing again results in increased installation time, cost and maintenance time.

Another example of an alternative irrigation system is a knitted, fabric mulch irrigation system disclosed in U.S. Pat. No. 3,888,418, and issued to Robert T. Seith on Jun. 10, 1975. This system generally comprises a fabric "netting" used to prevent erosion, control weeds, enrich the soil and irrigate the land. This device also suffers from drawbacks similar to those set forth above. Again, the complexity of the device increases manufacturing costs. Additionally, the size of the knitted fabric is typically limited to the size of the vehicle on which the device is delivered. Still further, the fabric is inflexible in the longitudinal and lateral directions making the device ill-suited to uneven and/or sloping terrain. Finally, the device must have an irrigation tube or pipe connected at each wale in order to produce even distribution of the irrigation fluid, thus increasing the time and costs of installation and maintenance.

Accordingly, there is a need for a fluid/gas irrigation and/or collection device which allows adaptability to uneven or sloping terrain, has even collection and distribution characteristics, is easy to ship and store, and has low maintenance, cost and installation times. Additionally, it is desirable that the device be simple to repair and/or integrate with existing systems.

SUMMARY OF THE INVENTION

A fluid collection and distribution system (irrigator) according to various aspects of the present invention is formed from a flexible or semi-flexible material which can conform to various sizes and shapes of terrain. According to various embodiments of the irrigator, seep holes may be provided. Additionally, the irrigator may be configured from a porous material. In various embodiments, the irrigator contains through holes for various plant life to take root through and to facilitate drainage. The irrigator may have multiple, distinct passages for collecting and distributing various fluids and gases. In addition, an irrigator forming device is provided for making the irrigator. Still further, an irrigator cutting device is provided for customizing and repairing the irrigator.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF PREFERRED EXEMPLARY EMBODIMENTS

The following descriptions are of preferred exemplary embodiments only, and are not intended to limit the scope, applicability, or configuration of the invention in any way. Rather, the following description provides a convenient illustration for implementing a preferred embodiment of the invention. Various changes may be made in the function and arrangement of elements described in the preferred embodiments without departing from the spirit and scope of the invention as set forth in the appended claims. In addition, while the following detailed description is mainly described with respect to fluid irrigation and collection systems, the device is readily configured to be adapted for gas distribution and/or collection, and both fluids and gases are referred to herein, generally, as fluids. Further, though the following descriptions may be described with reference to water as the distributed (or collected) fluid, it should be apparent to one skilled in the art that other fluids such as, inter alia, insecticides, fungicides, fertilizers and the like may similarly be used with the device.

Thus, in general, according to an exemplary embodiment of the present invention, an irrigator is provided for the distribution and/or collection of fluids from the environment. The irrigator is suitably configured to be adaptable to various shapes and sizes of land in need of fluid distribution and/or collection. Additionally, the irrigator is suitably resistant to damage, corrosion, wear and tear and has the ability to be easily repaired when damaged. Still further, according to another aspect of the preferred embodiment of the present invention, the irrigator is suitably configured to be easily connectable to various other fluid distribution and collection systems, and/or alternatively, other irrigators.

Figure 1:
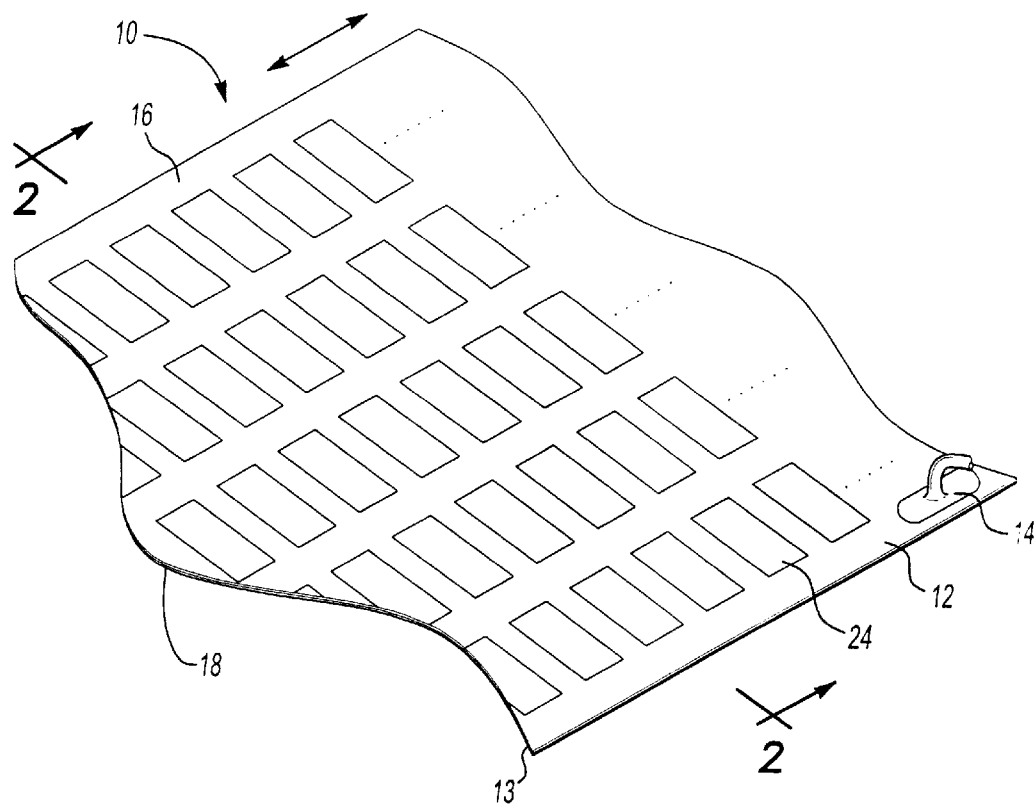
FIG. 1 is a cross-sectional isometric cut away view of an exemplary embodiment of the irrigation sheet.
Figure 18:
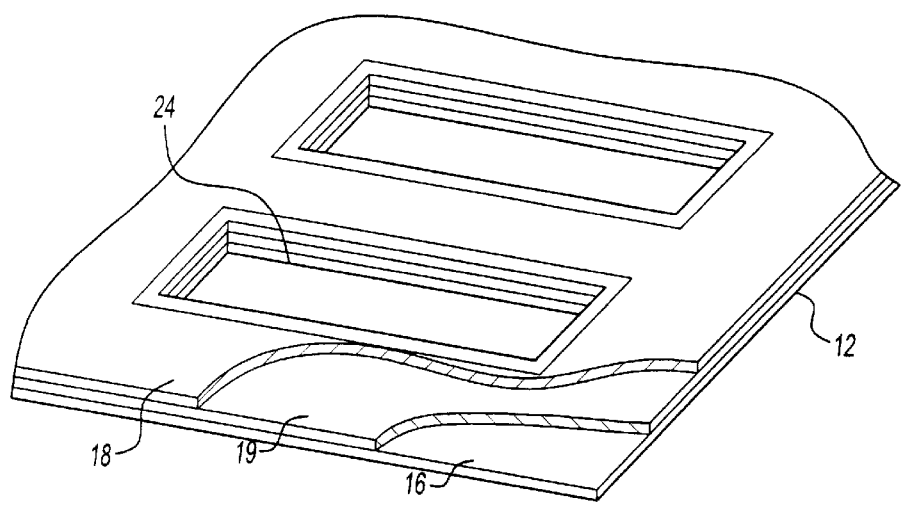
FIG. 18 is a cross-sectional isometric view of an exemplary embodiment of an irrigation sheet containing a strengthening sheet.

Therefore, with reference to FIG. 1, according to a preferred embodiment of the present invention, an irrigator 10 is suitably comprised of an irrigator sheet 12 and at least one connector device 14. Irrigator sheet 12 is suitably comprised of a first layer 16 and a second layer 1S, which define a cavity 13. Additionally, according to various alternative aspects of the preferred embodiment and with momentary reference to FIG. 18, one or more additional layers 19 may be provided. Additional layers 19 suitably define additional, separated cavities within irrigator 10 and/or strengthen irrigator sheet 12.

According to a preferred embodiment of the present invention, layers 16,18 are suitably comprised of a flexible or semi-flexible material. According to one aspect of this embodiment, layers 16, 18 may be suitably comprised of a porous or non-porous material such as, for example, a plastic material such as VisPore™ manufactured by Tredegar Film Products of Richmond, Va., or other similar material such as polyethylene, polypropylene, nylon or the like.

Figure 3:
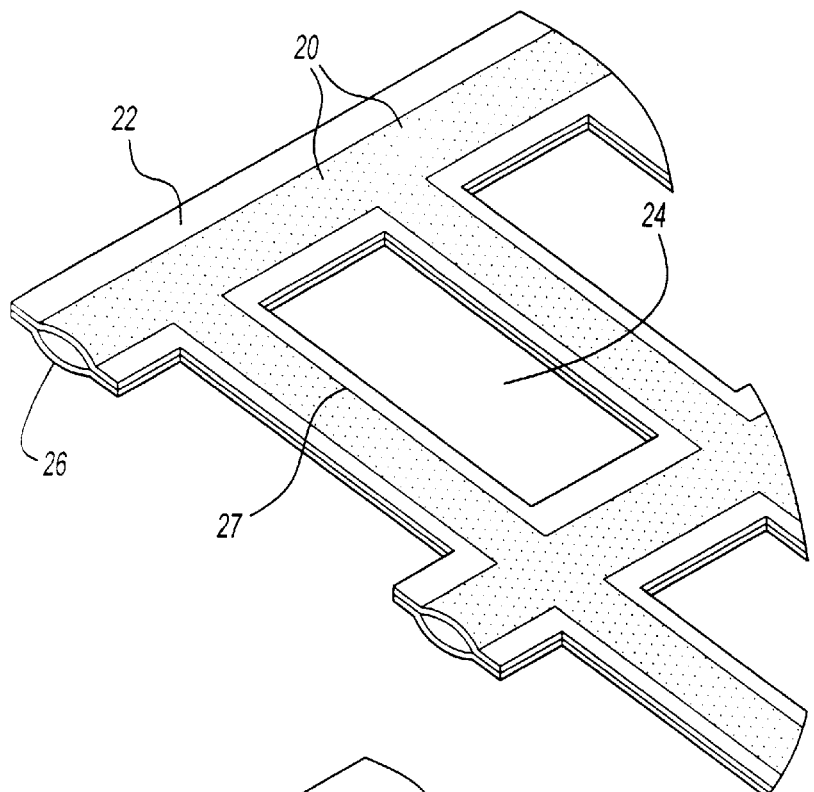
FIG. 3 is a close-up view of an exemplary embodiment of the irrigation sheet.

Alternatively, with reference to FIG. 3, one or both of layers 16,18 may contain a plurality of seep holes 20 to facilitate the transfer of fluids between the environment and irrigator 10. Still further, first layer 16 and second layer 16,18 may be configured in any combination or configuration of materials, such as, for example, where one layer is porous and the opposing is non-porous or where one layer contains seep holes 20 and the opposing does not, or any combination of porous materials, non-porous materials, materials with seep holes 20 and materials without seep holes 20.

In the present exemplary embodiment, the material for first and second layers 16,18 is typically provided in rolls of varying width. The length of layers 16,18 is determined by cutting the material to the desired lengths as the material is unrolled. Layers 16,18 may be suitably cut in a variety of desired shapes in order to suitably conform to the terrain and structures on the terrain desired to be covered by irrigator 10.

In accordance with one aspect of the present embodiment, layers 16, 18 are suitably secured to each other at an outer edge 22 of layers 16,18 in such a manner to form a cavity 13 between first and second layers 16, 18. First and second layers 16,18 are suitably secured by a fusing/welding process using heat, ultrasonic energy and the like. This fusing process creates a water/air tight seal between cavity 13 and the area external to irrigator 10.

Figure 2:
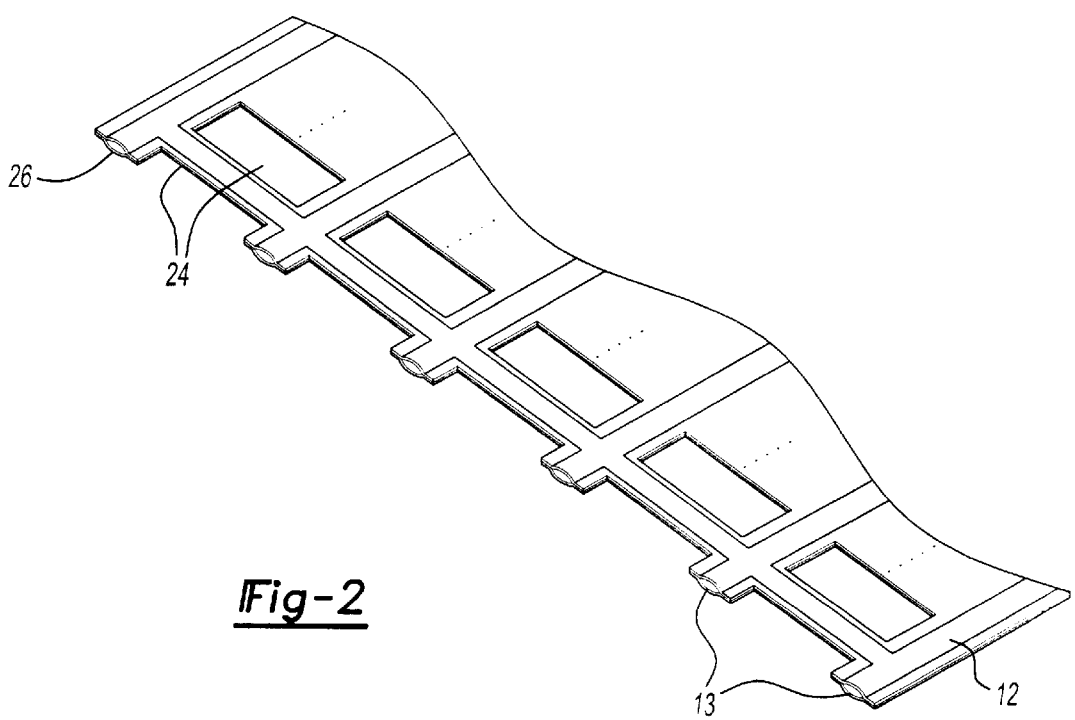
FIG. 2 is cross-sectional isometric view of an exemplary embodiment of the irrigation sheet.

In accordance with another aspect of a preferred embodiment of the present invention, and with reference to FIGS. 1–3, a plurality of through holes 24 are formed irrigator 10, thereby dividing cavity 13 and creating a series of passageways 26 within irrigator 10. Generally, through holes 24 are formed before or after first and second layers 16,18 are sealed, though, in the preferred embodiment of the present invention, through holes 24 are formed after layers 16,18 are sealed.

Figure 4A:
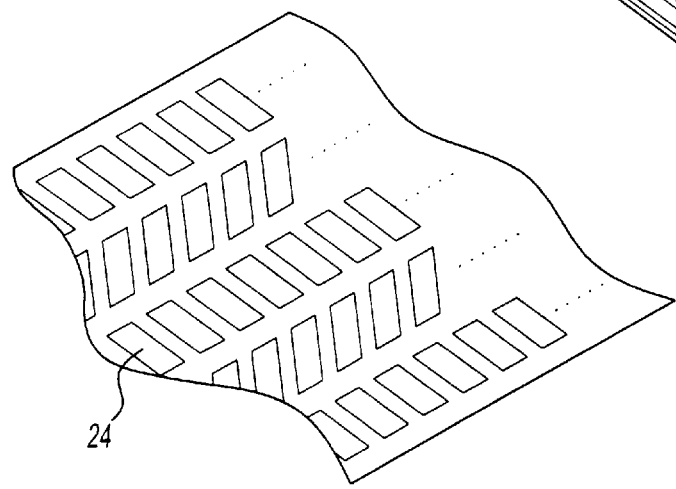
FIGS. 4a,b,c are examples of various through-hole configurations of the irrigation sheet.
Figure 4B:
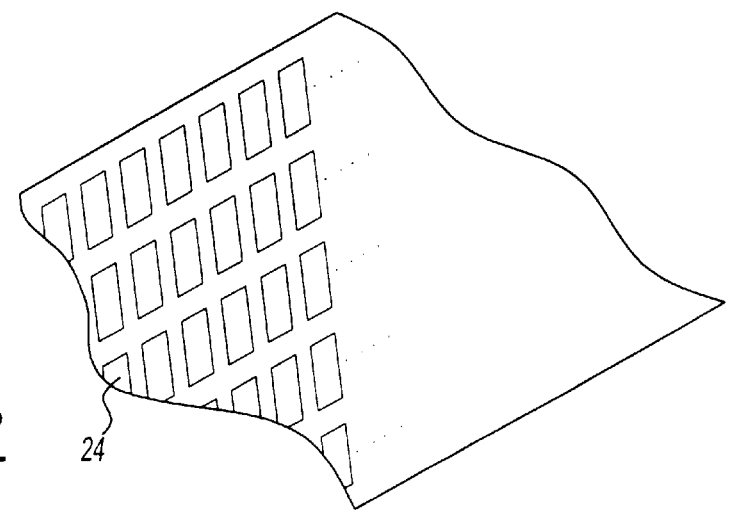
Figure 4C:
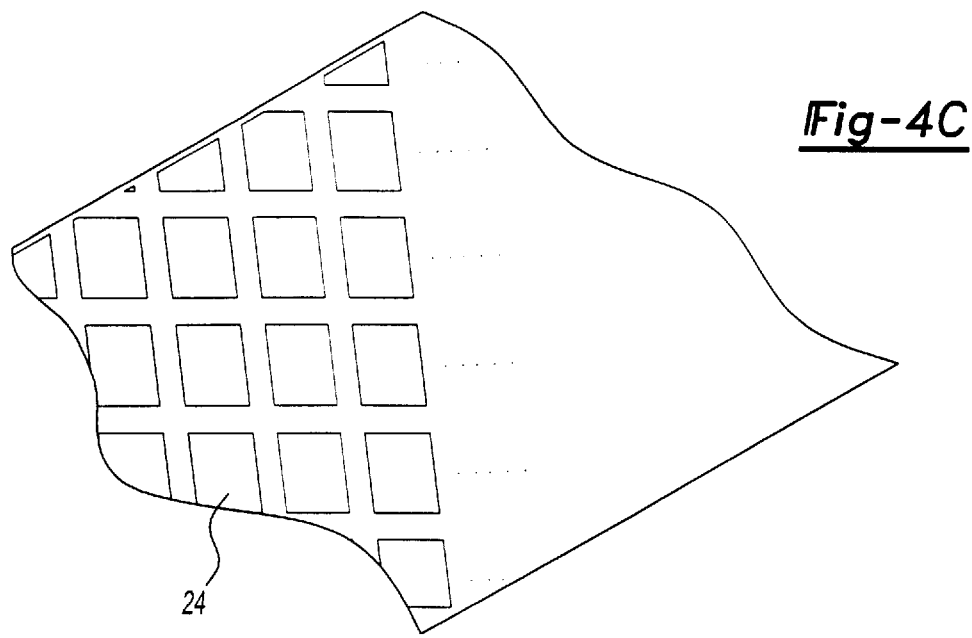
Figure 19:
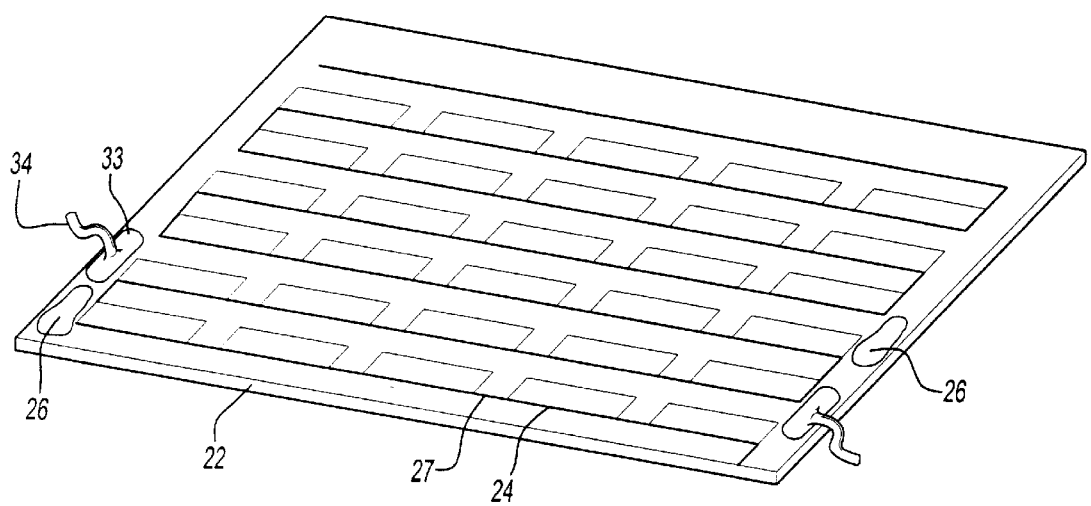
FIG. 19 is a top view of an alternate embodiment which allows simultaneous distribution of multiple fluids.

According to a preferred embodiment of the present invention, through holes 24 are suitably formed as rectangular apertures, though, with momentary reference to FIGS. 4a,b,c through holes 24 may similarly be configured in a variety of other shapes and sizes such as diamond, trapezoidal, tire-tread shaped and the like depending on the particular application of irrigator 10. Similarly, the organization, direction, size and configuration of passageways 26 will vary according to the configuration and amount of through holes 24. Additionally, with momentary reference to FIG. 19, according to various aspects of the present exemplary embodiment, through holes 24 and through hole seams 27 may suitably define, depending on the configuration of through holes 24 and seams 27, distinct passageways 26 capable of carrying and keeping separate multiple fluids.

Figure 5:
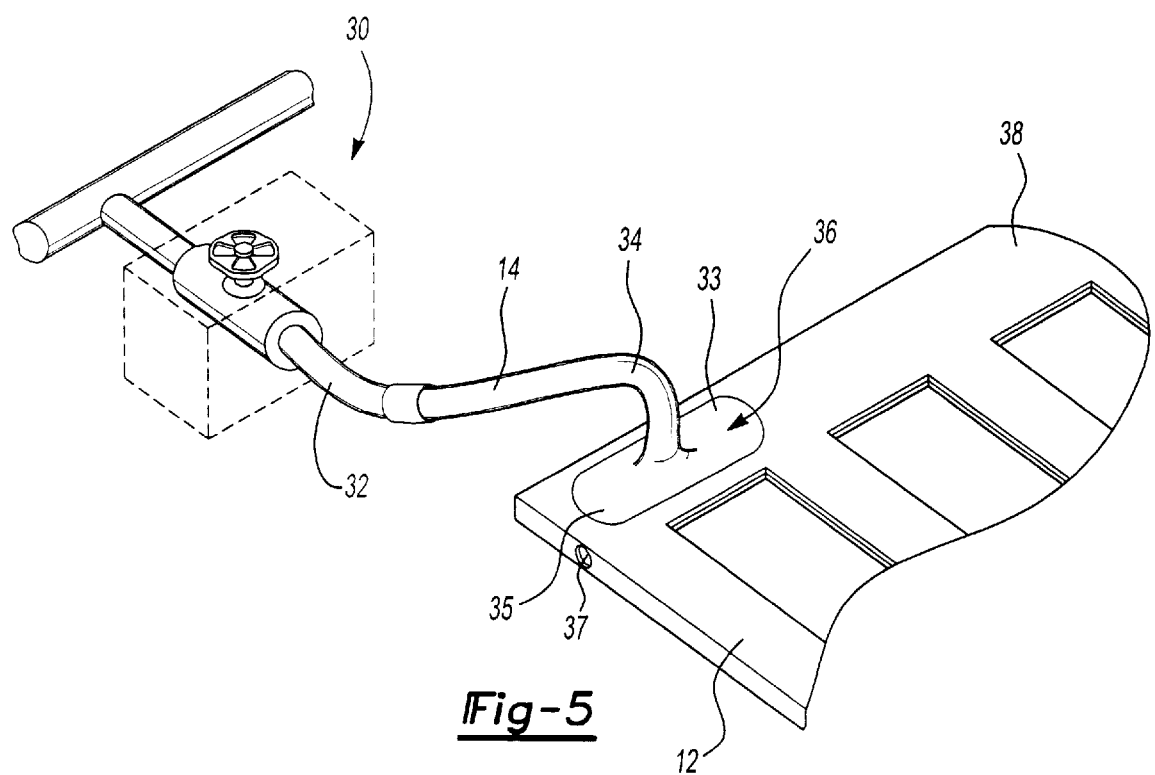
FIG. 5 is an isometric view of an irrigation sheet connected to an irrigation supply pipe.

With reference now to FIG. 5, in accordance with an exemplary embodiment of the present invention, connector 14 for transferring and/or receiving fluids from irrigator sheet 12 is provided. Connector 14 is suitably formed from a standard flexible, semi-flexible or rigid hose or pipe. Connector 14 contains a first end 32 and a second end 34. First end 32 is suitably configured to be connected to a fluid/gas distribution and/or collection source 30, such as a standard water faucet. Additionally, according to an alternative aspect of the present exemplary embodiment, and with momentary reference to FIG. 8, connector 14 may be suitably configured to integrally connect multiple irrigator sheets 12.

With reference back to FIG. 5, in accordance with the present exemplary embodiment, second end 34 is connected to irrigator sheet 12 such that a sealed connection between connector 14 and irrigator sheet 12 is provided. According to one aspect of the present exemplary embodiment, second end 34 is suitably configured with a flexible pad 33. Flexible pad 33 is suitably formed from a material which will conform and create a seal between connector 14 and irrigator sheet 12, such as, for example, a material similar to that of irrigator sheet 12 or other flexible or semi-flexible materials such as rubber, plastic, nylon and the like.

Figure 6:
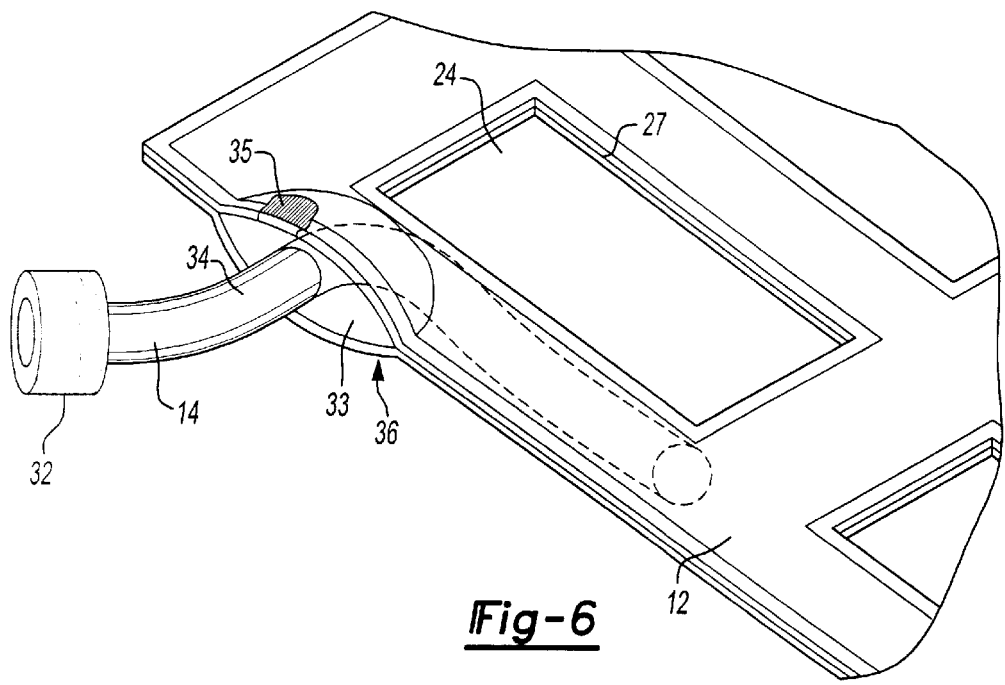
FIG. 6 is an isometric view of an alternative embodiment of a connection between an irrigation sheet and a supply pipe.
Figure 7:
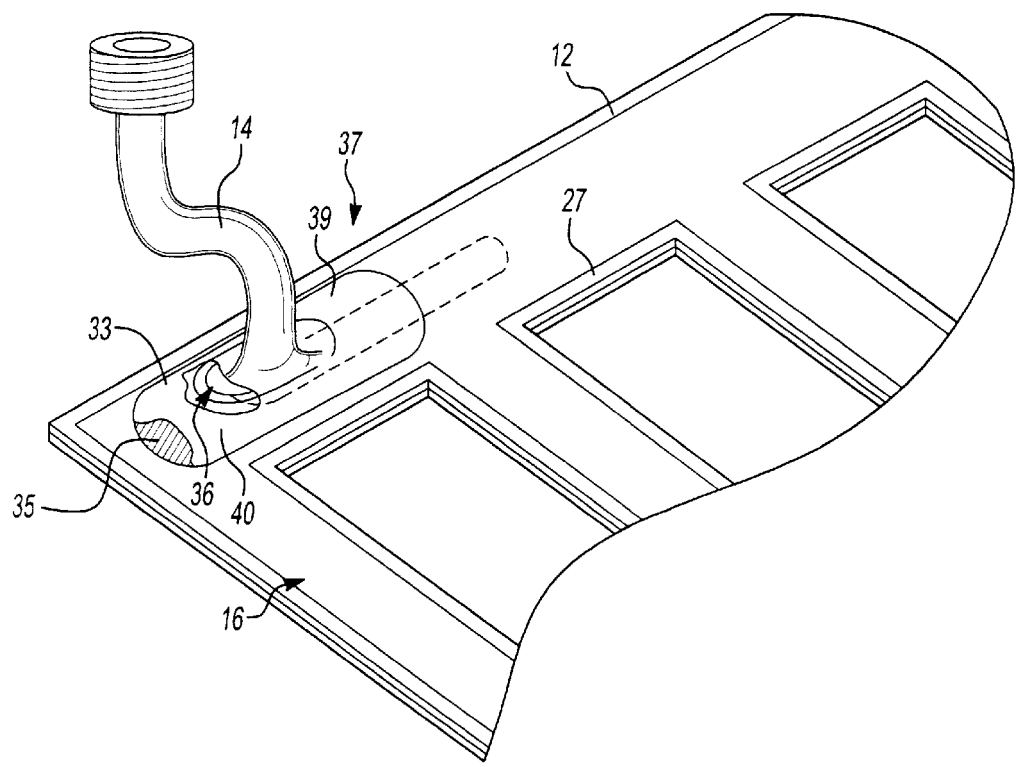
FIG. 7 is an isometric view of an exemplary embodiment of a connection between an irrigation sheet and a supply pipe.
Figure 8:
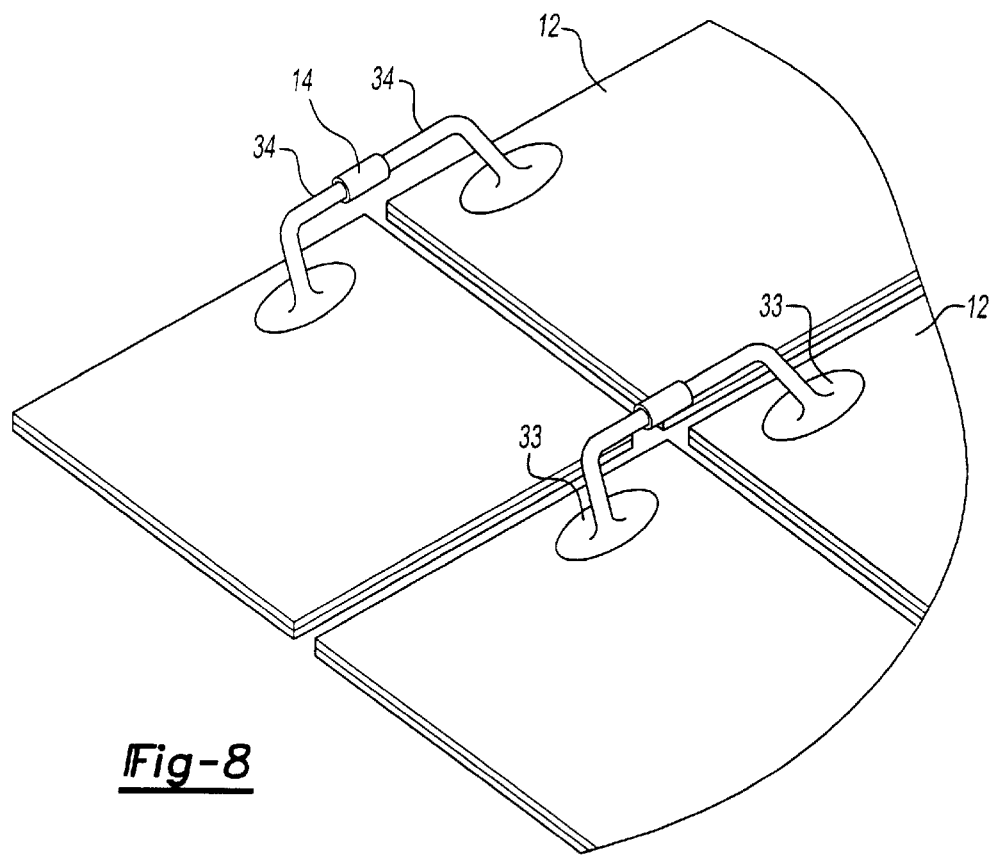
FIG. 8 is an isometric view of an exemplary embodiment of a connection between multiple irrigation sheets.

In accordance with the present exemplary embodiment and with reference to FIGS. 6–8, flexible pad 33 suitably contains a first adhesive surface 35 on a lower side of pad 33. Connector 14 and flexible pad 33 are placed over an input port 36 located on irrigator sheet 12. In the present exemplary embodiment, input port is suitably located proximate to a corner 37 of irrigator sheet 12 on first or second layer 16,18 of irrigator sheet 12. However, according to various alternative aspects of the present invention, input port 36 may be located in any desired location on irrigator sheet 12, Such as, for example and as shown in FIG. 6, between first and second layers 16,18. Referring back to FIG. 7, pad 33 is then adhered to a first or second layer 16,18 of irrigator sheet 12, creating the seal between connector 14 and irrigator sheet 12.

Figure 9:
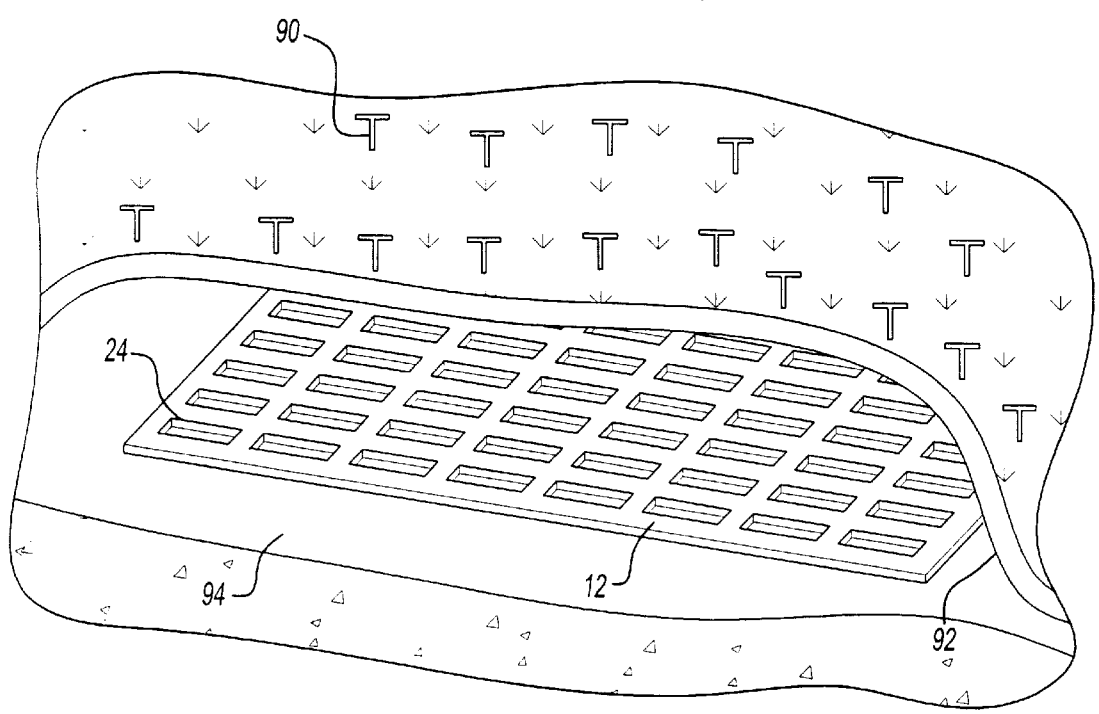
FIG. 9 is an isometric view of an exemplary embodiment of the irrigation sheet placed under a layer of sod.
Figure 10:
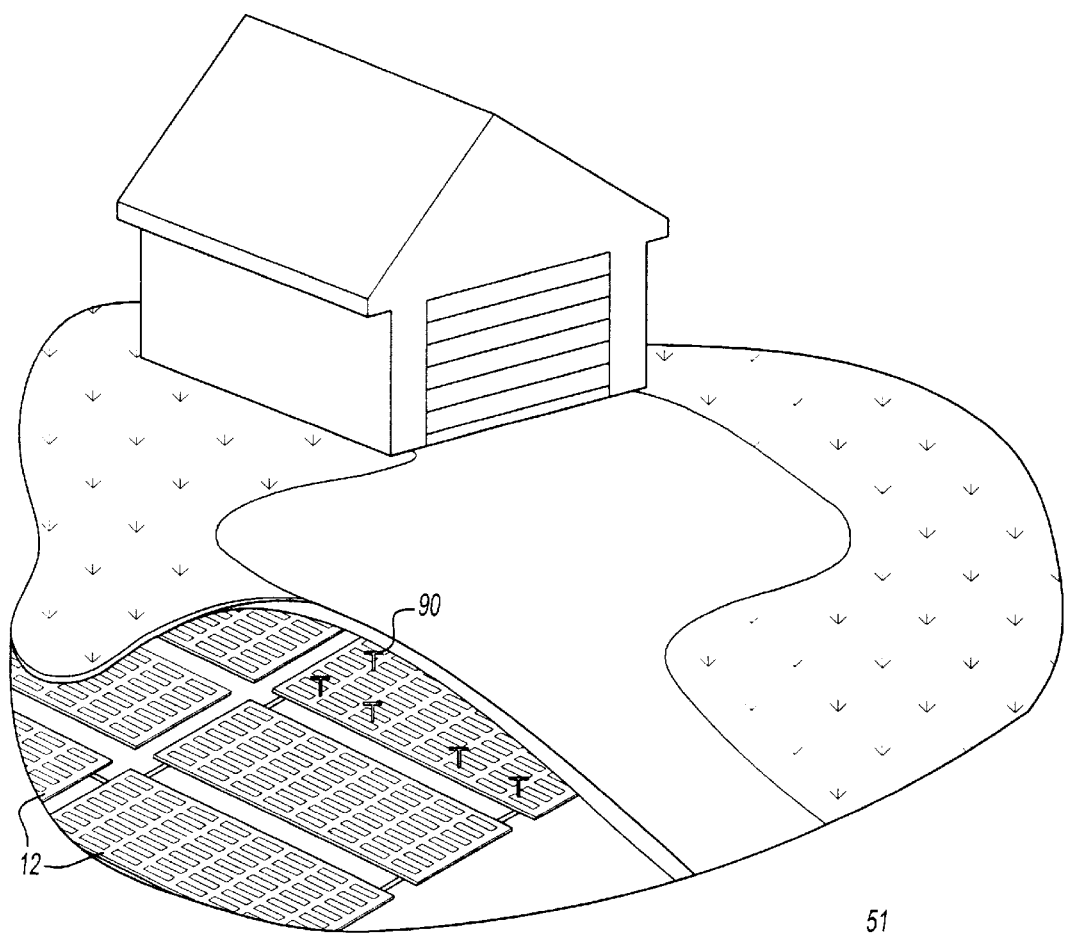
FIG. 10 is an isometric view of hillside installation of strengthened irrigation sleets.

FIGS. 9 and 10 show typical installation of irrigator 10. Irrigator 10 is suitably placed in an area desired to be irrigated. According to one embodiment of the present invention, one or more stakes 90 may be provided in order to anchor irrigator 10 to the ground 90, for example on sloping terrain. Once placed and anchored, irrigator sheet 12 is suitably covered with sod 92, 94, soil, or anything desired to be irrigated. Through holes 24 suitably provide the ability of root systems of plant life placed above irrigator sheets 12 to reach underlying earth and additionally, may suitably provide drainage into the underlying soil. Connector 14 is suitably connected to a fluid/gas distribution/collection source which is then tuned on and oft as so desired.

Figure 11:
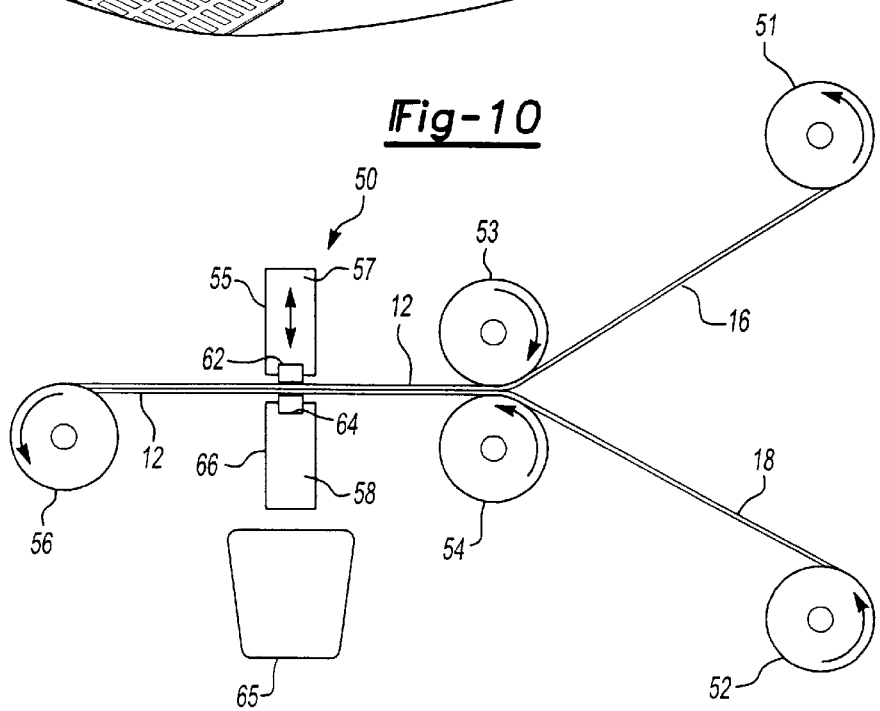
FIG. 11 is a front view of an exemplary embodiment of an irrigation sheet manufacturing device.
Figure 12:
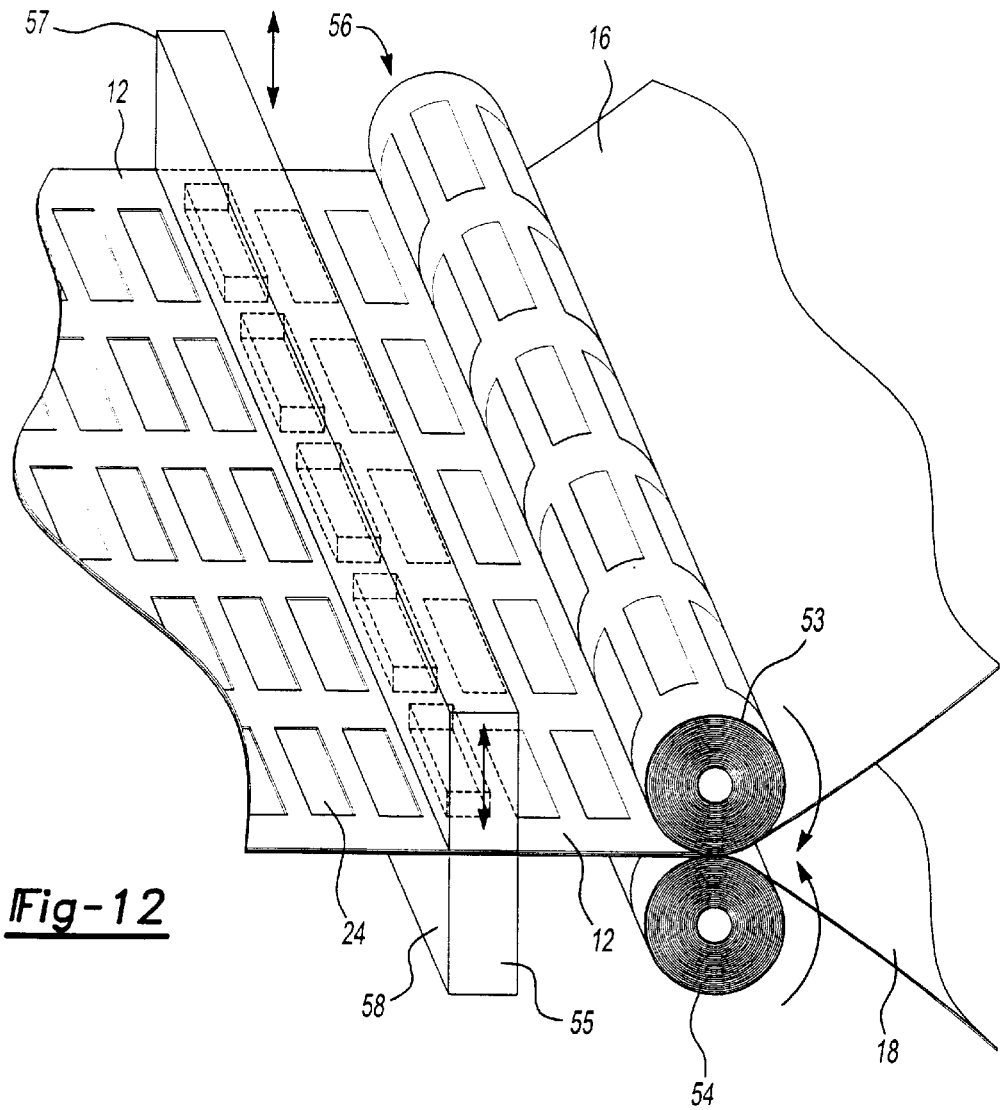
FIG. 12 is an isometric view of an exemplary embodiment of an irrigation sheet manufacturing device.
Figure 13:
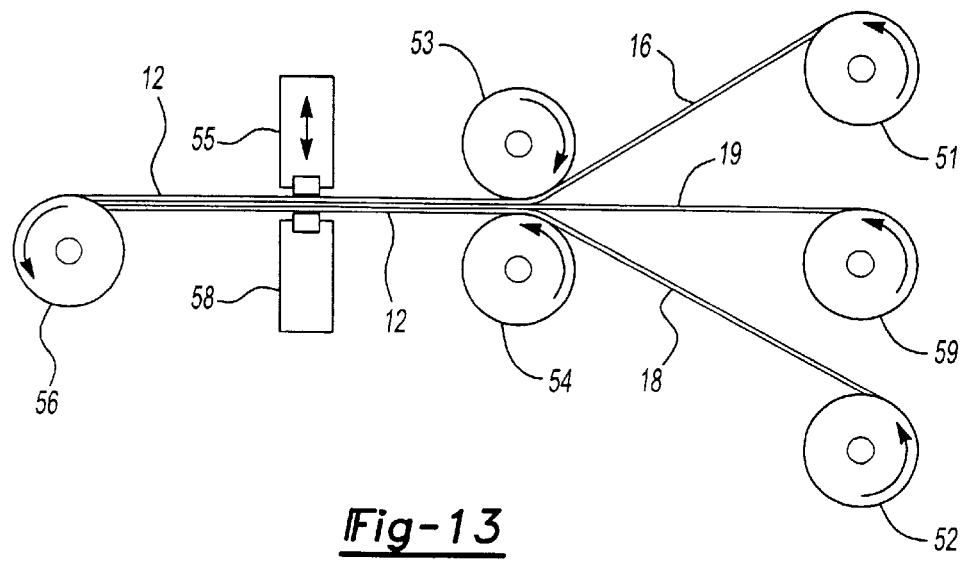
FIG. 13 is a front view of an exemplary embodiment of an irrigation sheet manufacturing device used for strengthening irrigation sheets.

Now, in accordance with a preferred embodiment of the present invention and with reference to FIGS. 11 and 12, irrigator sheet 12 may be suitably formed by a roller/welder device 50. Roller device 50 is suitably comprised of two supply rollers 51,52, two welding, rollers 53,54, a through hole cutter device 55, and a product roll 56. Additionally, with momentary reference to FIG. 13, a strengthening material roller 59 may be provided for supplying additional layers to irrigator sheet 12.

First and second layers 16,18 are suitably fed from supply rollers 51,52 through welding rollers 53,54 in order to seal outer edges 22 of first and second layers 16,18 and inner edges 21 of through holes 24 to form irrigator sheet 12. In accordance with the present exemplary embodiment, welding rollers 53, 54 suitably supply the heat, ultrasonic energy, etc. which fuses outer edges 22 of layers 16, 18 in order to form irrigator sheet 12 and creates a through hole seam 27.

Next, in accordance with the present exemplary embodiment, irrigator sheet 12 then passes through hole cutter 55 where through holes 24 are formed. Hole cutter 55 suitably removes through hole material 66 inside through hole seam 27 from layers 16,18 in order to form through holes 24 by stamping, cutting, melting, burning or the like. For example, according to one aspect of the present exemplary embodiment, through holes 24 may be formed by "stamping" material from layers 16,18 by means of a die and stamp device. Alternatively, material may be "cut" from layers 16,18 by means of a cutting device such as a knife, blade or similar device.

Thus, according to one aspect of the present exemplary embodiment and with continuing reference to FIG. 11, cutter 55 is suitably configured with an upper stamp 57 and a lower stamp 58. Upper stamp 57 is suitably configured with at least one upper die 62. Similarly, lower stamp 58 is suitably configured with a lower die 64. According to the present aspect of this embodiment, tipper die 62 is suitably configured as a projection configured in the desired shape of through hole 24, while lower die 64 is configured as a reception corresponding to the shape of projection 62 such that reception 64 can suitably receive upper die 62 to cut through hole 24. In accordance with another aspect of the present exemplary embodiment, product roll 56 suitably receives irrigator sheet 12 once formed.

Still further, with continuing reference to FIG. 11, according to another aspect of the present exemplary embodiment, a collection bin 65 may be provided for collecting removed through hole material 66 as hole cutter 55 creates through hole 24.

Figure 14:
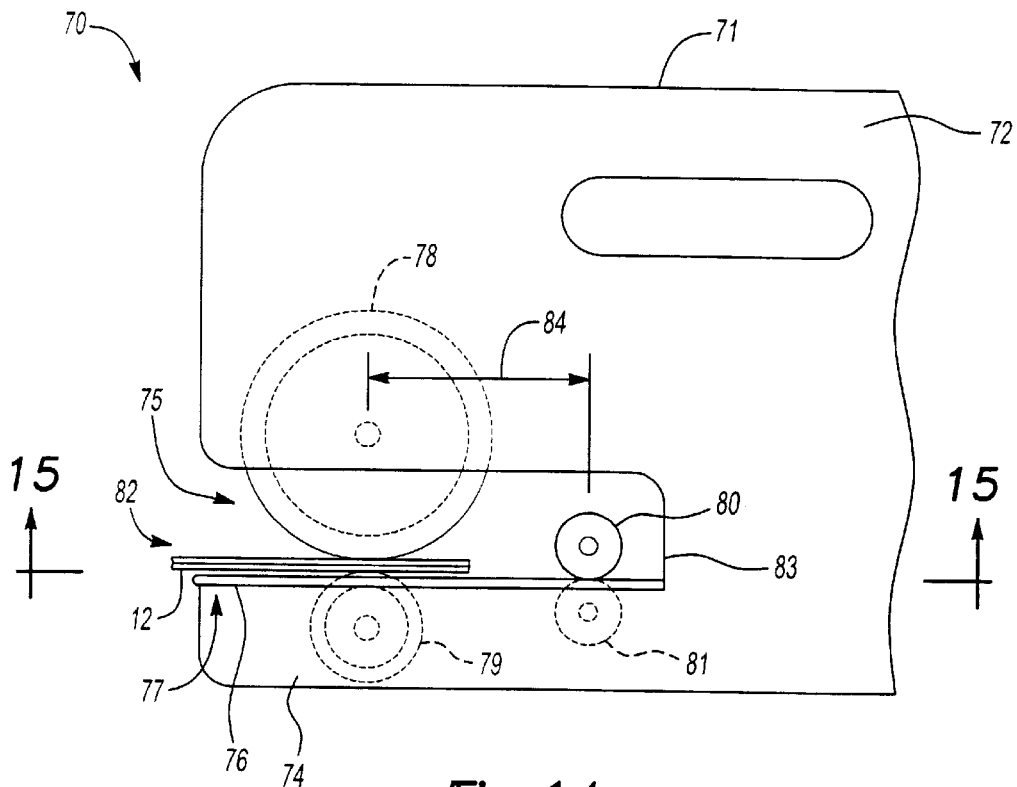
FIG. 14 is a cross-sectional side view of an exemplary embodiment of an irrigation sheet cutting/welding device.

Now, with reference to FIG. 14, according to another aspect of the present invention, a portable irrigator cutting device 70 is provided. Cutting device 70 is suitably configured with a body 71 having a handle 72, an upper jaw 73 and a lower jaw 74. In accordance with the present exemplary embodiment, body 71 is formed from a rigid supportive material such as plastic, nylon, fiberglass, aluminum and the like. Upper and lower jaws 73,74 suitably form a mouth 75 for feeding irrigator sheet 12 therethrough. Additionally, according to another aspect of the present exemplary embodiment, a guide plate 76 configured from a rigid material similar to body 71 of cutting device 70 is suitably provided oil a upper surface 77 of lower jaw 74. Guide plate 76 is suitably wider than lower jaw 74 in order to provide support as irrigator sheet 12 is passed through cutting device 70.

Figure 15:
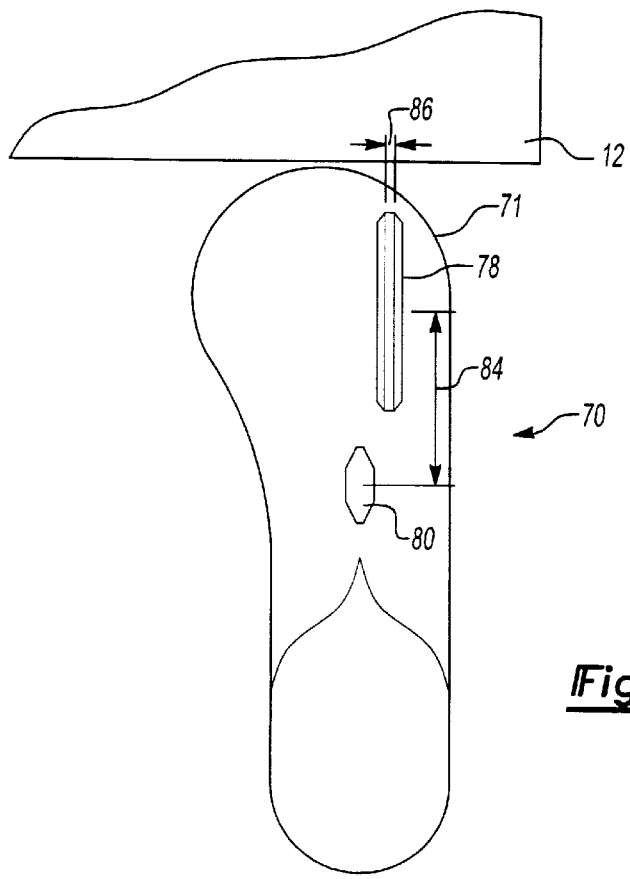
FIG. 15 is a top view of an exemplary embodiment of an irrigation sheet cutting/welding, device.

Cutting device 70 additionally suitably contains upper and lower welding wheels 78,79 and tipper and lower cutting wheels 80,81. In the present exemplary embodiment, welding wheels 78,79 are located on an outer end 82 of jaws 73,74 and Cutting wheels 80,81 are located on an inner end 83 of jaws 73,74 thereby creating a turning distance 84. Generally, as described below, as turning distance 84 decreases, smaller turning radii are possible as cutting device 70 is operated, which in turn, allows more accurate cutting and repairing of irrigator sheet 12. Additionally, with reference to FIG. 15, according to another aspect of the present embodiment, welding wheels 78,79 may be variably offset from cutting wheels 80,81 in order to vary the amount of material between the welding seam and the cutting line.

Further, in various alternative embodiments of the present invention, the positions of welding wheels and cutting wheels may be reversed. Additionally, according to another embodiment, Cutting wheels 80,81 and welding wheels 78,79 may be suitably integrated as one piece which both cuts and fuses layers of irrigator sheet 12 in one step.

In accordance with the present exemplary embodiment, welding wheels 78,79 suitably provide heat, ultrasonic energy or other similar energy in order to fuse first and second layers 16,18 as layers 16,18 pass between welding wheels 78,79.

In accordance with the present embodiment, welding wheels 78,79 are provided to weld through irrigator sheet 12. In accordance with the present exemplary embodiment, welding wheels 78,79 are formed as radial disks which taper to an edge 85 suitable for welding the material of irrigator sheet 12. In addition, in accordance with alternative embodiments of the present invention, cutting rollers 80,81 may be configured as knives, scissors or other "blade-like" devices suitable for cutting through the material of irrigator sheet 12.

Figure 16:
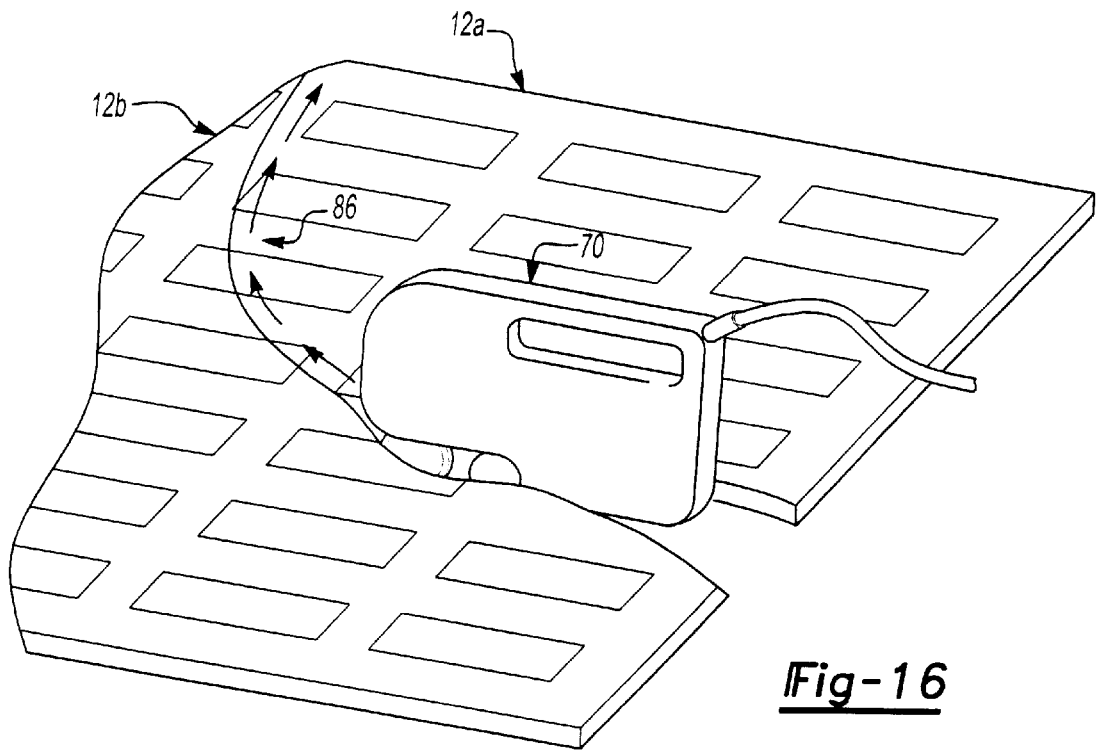
FIG. 16 is an isometric view of an irrigation sheet cutting/welding device in operation.
Figure 17:
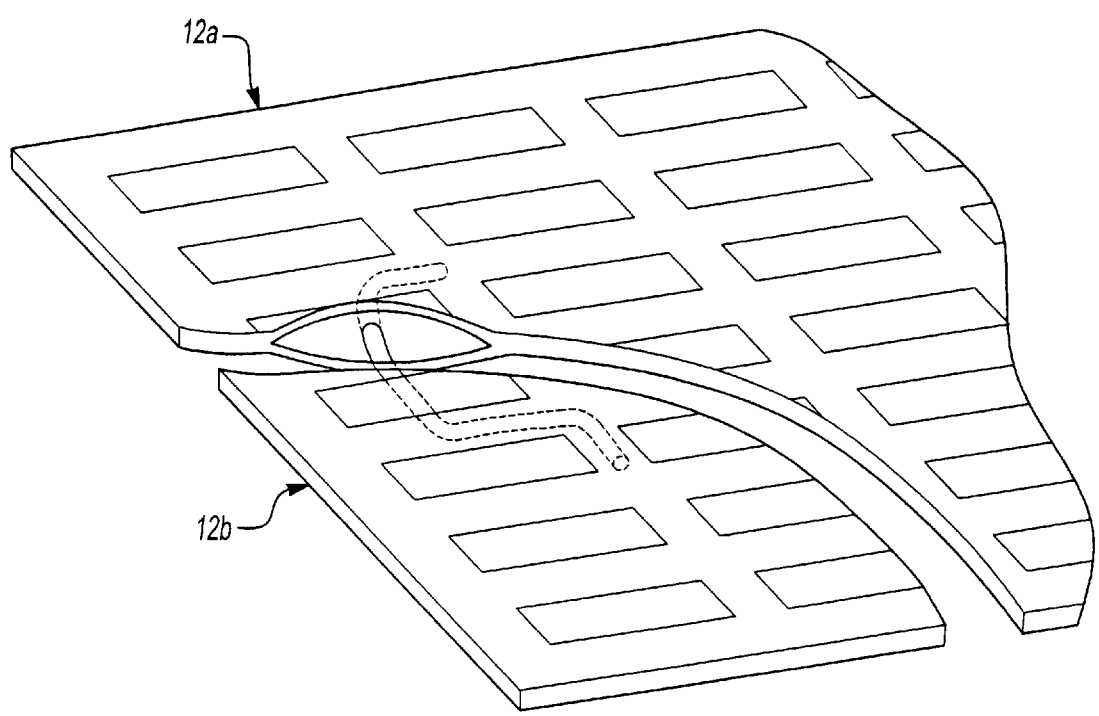
FIG. 17 is an isometric view of an irrigation sheet which has been repaired by replacing a portion with a new sheet.

Thus, with reference to FIGS. 16 and 17, in the present exemplary embodiment, irrigator sheet 12 can be custom fit to various areas of land or may be repaired using cutting device 70. Irrigator sheet 12 is passed through mouth 75 of cutting device 70. Sheet 12 passes through welding rollers 78,79 which creates a fused seam 86 on irrigator sheet 12. Irrigation sheet 12 then suitably passes through cutting rollers 80,81 cutting seam 86 proximate to one edge of seam 86. Alternatively, irrigator sheet 12 may pass through cutting rollers 80,81, suitably cutting seam 86 proximate to the center of seam 86, thereby creating two separate sealed irrigator sheets 12a,b and enabling sealed irrigator sheets 12 of various shapes and sizes.

Finally, cutting device 70 can be used to repair and/or remove damaged sections of irrigator sheet 12 by cutting away damaged portions of irrigator sheet 12, leaving an undamaged irrigator sheet 12.

Thus, while the principles of the invention have been described in illustrative embodiments, many combinations and modifications of the above-described structures, arrangements, proportions, the elements, materials and components, used in the practice of the invention in addition to those not specifically described may be varied and particularly adapted for a specific environment and operating requirement without departing from those principles.

I claim:

1. An irrigator system that is configured to distribute a fluid into soil at least partially covering the irrigator system, comprising:
   a first layer of porous material having a first outer edge and a first aperture;
   a second layer of material having a second outer edge and a second aperture, said second outer edge secured to said first outer edge to form a first cavity between said first layer of porous material and said second layer of material and said first aperture substantially aligned with said second aperture to form a first through hole configured to pass a portion of the soil; and
   a connector having a first end connected to said first cavity and a second end configured for connection to a fluid source, said connector further configured to provide the fluid from said fluid source into said first cavity such that the fluid is distributed through said first layer of porous material into the soil at least partially covering the irrigator system.

2. The irrigator system of claim 1, further comprising a third layer of material disposed between said first layer of porous material and said second layer of material, said third layer of material having a third aperture substantially aligned with said first aperture and said second aperture to form said first through hole.

3. The irrigator system of claim 1, wherein said second layer of material has a seep hole configured to distribute the fluid into the soil at least partially covering the irrigator system.

4. The irrigator system of claim 1, wherein said first layer of porous material, said second layer of material and said first through hole define a first passageway.

5. The irrigator system of claim 1, further comprising at least one stake for anchoring the irrigator system to the soil.

6. The irrigator system of claim 1, wherein said second layer of material is a porous material configured to distribute the fluid into the soil at least partially covering the irrigator system.

7. The irrigator system of claim 1, wherein the fluid is water.

8. The irrigator system of claim 1, wherein said first layer of porous material is a semi-flexible material.

9. The irrigator system of claim 1, wherein said second layer of material has a plurality of seep holes configured to distribute the fluid into the soil at least partially covering the irrigator system.

10. The irrigator system of claim 1, wherein said first through hole is a rectangular aperture.

11. The irrigator system of claim 1, further comprising:
    a third layer of porous material having a third outer edge and a third aperture;
    a fourth layer of material having a fourth outer edge and a fourth aperture, said fourth outer edge secured to said third outer edge to form a second cavity between said third layer of porous material and said fourth layer of material and said third aperture substantially aligned with said fourth aperture to form a second through hole configured to pass a second portion of the soil through said second cavity.

12. An irrigator system that is configured to distribute a fluid into soil at least partially covering the irrigator system, comprising:
    a first layer of material having a first outer edge, a first aperture and a first seep hole;
    a second layer of material having a second outer edge and a second aperture, said second outer edge secured to said first outer edge to form a first cavity between said first layer of material and said second layer of material and said first aperture substantially aligned with said second aperture to form a first through hole configured to pass a portion of the soil; and
    a connector having a first end connected to said first cavity and a second end configured for connection to a fluid source, said connector further configured to provide the fluid from said fluid source into said first cavity such that the fluid is distributed through said first seep hole of said first layer of material into the soil at least partially covering the irrigator system.

13. The irrigator system of claim 12, wherein said second layer of material has a second seep hole that is configured to distribute the fluid into the soil at least partially covering the irrigator system.

14. The irrigator system of claim 12, wherein said second layer of material is a porous material that is configured to distribute the fluid into the soil at least partially covering the irrigator system.

15. The irrigator system of claim 12, further comprising at least one stake for anchoring the irrigator system to the soil.

16. The irrigator system of claim 12, wherein said second layer of material is a porous material configured to distribute the fluid into the soil at least partially covering the irrigator system.

17. The irrigator system of claim 12, wherein said second layer of material has a plurality of seep holes configured to distribute the fluid into the soil at least partially covering the irrigator system.

18. The irrigator system of claim 12, wherein said first through hole is a rectangular aperture.

19. The irrigator system of claim 12, further comprising:
a third layer of porous material having a third outer edge and a third aperture;
a fourth layer of material having a fourth outer edge and a fourth aperture, said fourth outer edge secured to said third outer edge to form a second cavity between said third layer of porous material and said fourth layer of material and said third aperture substantially aligned with said fourth aperture to form a second through hole configured to pass a second portion of the soil through said second cavity.

* * * * *